United States Patent [19]

Hoffman et al.

[11] Patent Number: 4,683,913

[45] Date of Patent: Aug. 4, 1987

[54] ROTARY AIR VALVE SEAL ARRANGEMENT

[75] Inventors: Donald E. Hoffman, Java Center, N.Y.; David B. McDonald, Königstein, Fed. Rep. of Germany

[73] Assignee: General Motors Corporation, Detroit, Mich.

[21] Appl. No.: 918,995

[22] Filed: Oct. 15, 1986

[51] Int. Cl.[4] .............................................. F17D 3/00
[52] U.S. Cl. .............................. 137/625.4; 137/625.44; 251/298; 277/212 C
[58] Field of Search ................ 137/625.4, 625.44, 875; 251/294, 298; 277/212 C

[56] References Cited

U.S. PATENT DOCUMENTS

| | | | |
|---|---|---|---|
| 3,570,539 | 3/1971 | Herring | 137/625.4 |
| 4,156,439 | 5/1979 | Jeffries et al. | 137/875 X |
| 4,498,528 | 2/1985 | Jacquet | 137/625.44 X |

Primary Examiner—William E. Tapolcai
Attorney, Agent, or Firm—R. L. Phillips

[57] ABSTRACT

A rotary air valve mounted in a case for rotatable movement about an axis to close either one of two adjacent openings has a flexible elastomeric seal that flexibly engages inwardly and outwardly facing curved sealing surfaces on the case to seal the respective openings when the valve closes same. The sealing surfaces have a radius of curvature whose axis is offset from that of the valve so that a predetermined contact pressure is established along the seal at the curved sealing surfaces to tightly seal the openings when the valve is closed but diminishes to zero immediately as the valve is rotated to open either opening to thereafter permit further opening of the valve uninhibited by the seal.

2 Claims, 5 Drawing Figures

ROTARY AIR VALVE SEAL ARRANGEMENT

TECHNICAL FIELD

This invention relates to rotary air valves and more particularly to the sealing thereof.

BACKGROUND OF THE INVENTION

In rotary air valves such as used in vehicle air conditioning, heating and ventilating systems, the periphery of the rotary air valve is required to seal against the surrounding case in a consistent manner with a minimum of effort. However, the peripheral sealing surface of a rotary air valve normally has sliding contact as compared with the face-to-face contact of a flapper valve making it difficult to control the contact pressure between the seal surfaces and with a minimum of friction. Typically, seal materials are selected, such as plastic foam, felt, wool pile, and rubber, in combination with various retainers in an attempt to control the contact pressure between the seal surfaces. However, the complexity of such combination designs requires added space, is costly and gives inconsistent sealing and frictional characteristics at various climatic conditions. For example, the different expansion characteristics between the valve, case and seals at temperature extremes causes inconsistent seal performance particularly at certain low temperature situations where it is possible for the valve to freeze in position. The functional problem of the rotary valve in turn cause high control lever efforts and potential overload of the valve's operating mechanism.

SUMMARY OF THE INVENTION

The present invention solves these problems in a simple, reliable, low cost manner with an improved sealing arrangement wherein the curved sealing surface on the valve case instead of being normally concentric with the valve axis have a fixed radius of curvature whose axis is offset from that of the valve. A flexible elastomeric seal is then mounted on the periphery of the rotary air valve extending along the two arcuate side edges and two opposite straight end edges thereof. The rotation of the valve because of the offset axis of the sealing surfaces on the case then carries the arcuate side seal portions away from or toward rather than along the curved sealing surfaces of the case while bringing the end seal portions into or out of abutting engagement with the case's sealing surfaces. This unique geometrical relationship between the valve seal assembly and the case's sealing surfaces establishes a predeterminable, consistently controlled contact pressure along the peripheral sealing arrangement to tightly seal the valve opening when the valve is rotated to its closed position but diminishes to zero immediately as the valve is rotated to open to thereafter permit further opening of the valve uninhibited by the peripheral sealing arrangement. This both eliminates the described problems of conventional peripheral seal arrangements on rotary valves and provides seal-control lever efforts comparable to current flapper valve arrangements.

These and other objects, advantages and features of the present invention will become more apparent from the following description and drawing of the preferred embodiment of the invention shown in the attached drawings.

DESCRIPTION OF THE PREFERRED EMBODIMENT

Figure 1:
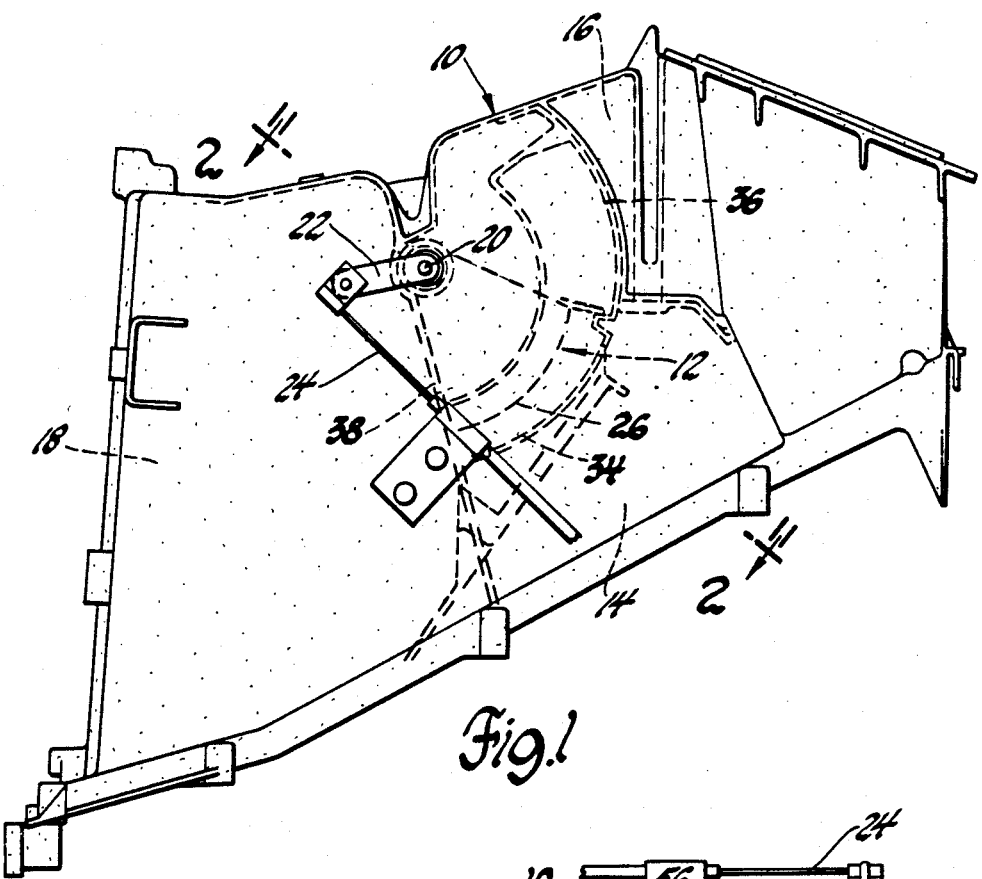
FIG. 1 is a top plan view of a portion of a vehicle air conditioning, heating and ventilating system incorporating the preferred embodiment of the rotary air valve sealing arrangement according to the present invention.
Figure 2:
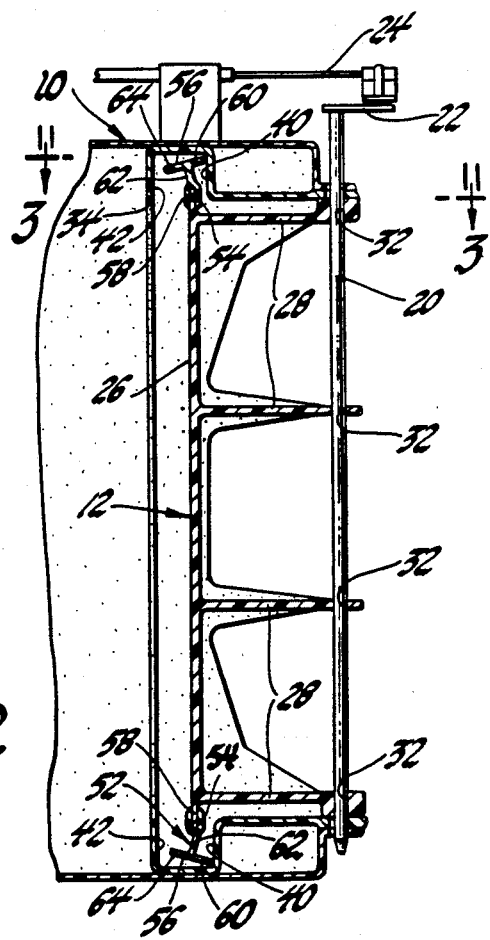
FIG. 2 is a sectional view taken along the line 2—2 in FIG. 1.
Figure 3:
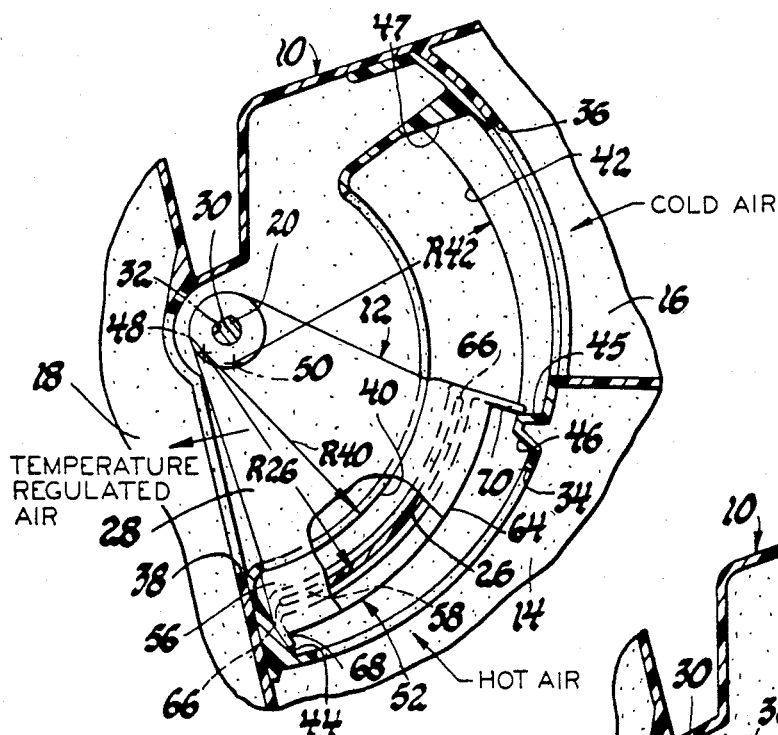
FIG. 3 is a sectional view taken along the line 3—3 in FIG. 2 showing the rotary air valve in one extreme position.

Referring to FIGS. 1, 2 and 3, there is shown a case or housing 10 forming a portion of a vehicle air conditioning, heating and ventilating system. A rotary air valve 12 mounted in the case provides air temperature control in the system by controlling the relative amounts of hot air in a duct 14 and cold air in a duct 16 allowed to pass through to a thus temperature-regulated supply duct 18 from which the air at the controlled temperature is distributed by a conventional arrangement (not shown) to the passenger space in the vehicle and to the windshield for defrosting. The rotary air valve 12 is mounted in the case on a shaft 20 whose opposite ends are journaled in opposite sides of the case as shown in FIG. 2. One end of the shaft 20 is connected to a lever 22 which in turn is connected by a sheathed wire 24 to a hand lever, not shown, that is manually controlled in the vehicle's passenger compartment to adjust the air valve to give the desired air temperature.

Figure 4:
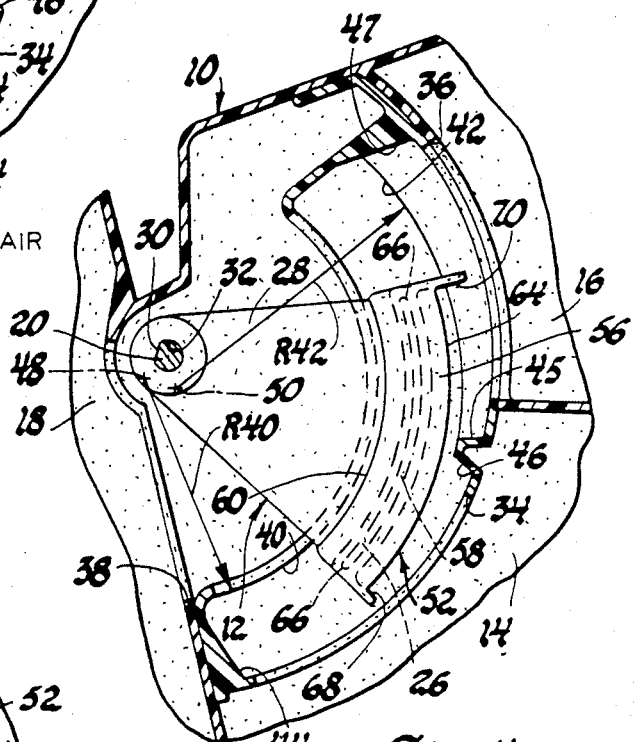
FIG. 4 is a view similar to FIG. 3 but showing the rotary air valve in a midposition.

Describing now the valve details, the rotary air valve 12 is preferably a one-piece, plastic-molded part of thin-wall, uniform-thickness design having a curved rectangular valve face 26 that is a segment of a cylindrical surface and four pie-shaped radially inwardly extending arms 28 by which the valve is connected to the shaft 20 by means of a flat 30 on the shaft and a conforming hole 32 in the inner end of each arm (see FIG. 3). One arm 28 is located at each side of the valve and the remaining two intermediately located arms are equally spaced across the width of the valve to not only provide for the pivotal support but also reinforce the strength thereof. The case 10 is formed with a valve opening 34 for the hot air in duct 14 and an adjacent opening 36 for the cold air in duct 16 and the valve face 26 is sized to cover each of the openings 34 and 36 when moved to its two extreme positions, the one being that shown in FIG. 3 where the valve face covers the hot air opening 34 and the other extreme position being that shown in FIG. 5 where the valve face covers the cold air opening 36. Then intermediate these two extreme positions, the valve face 26 is positionable to partially cover both of the openings 34 and 36 as shown in FIG. 4 to provide infinite proportioning of the cold and hot air that is mixed and delivered through an opening 38 in the case to the temperature regulated supply duct 18.

Figure 5:
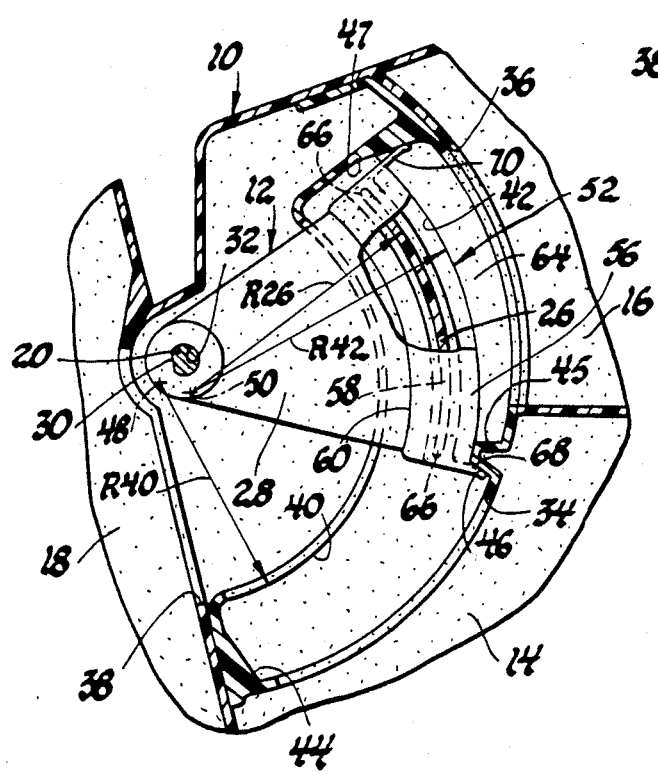
FIG. 5 is a view similar to FIG. 3 but showing the rotary air valve in its other extreme position.

In both the two extreme or closed positions of the valve face 26, sealing about the periphery thereof is required against the surrounding case in a consistent manner with a minimum of effort as earlier discussed. To this end, the valve face 26 has a fixed radius R26 and the case is formed along the opposite sides and inward of the two duct openings 34 and 36 about their respective periphery with radially outwardly facing curved sealing surfaces 40 of fixed radius for the hot air duct 14 and radially inwardly facing curved sealing surfaces 42 of fixed radius for the cold air duct 16 (see FIGS. 2 and 3). Then completing the case's sealing surfaces there is provided two radially-projecting, axially-extending end sealing surfaces 44 and 45 inward of the opening 34 and likewise two radially-projecting, axially-extending end sealing surfaces 46 and 47 inward of the other opening 36 (see FIG. 3). According to the present invention, the centers of the fixed radii R40 and R42 for the curved sealing surfaces 40 and 42 are not on the axis of the shaft 20 but are offset therefrom at points 48 and 50 respectively as shown in FIGS. 3–5 so that as the valve rotates from either closed position to an open position, the curved valve face 26 lifts or moves away from the respective curved sealing surfaces 40 and 42 rather than sliding therealong.

Sealing of the valve is provided by preferably a one-piece molded seal 52 of flexible elastomeric material such as rubber having a radially inwardly facing groove 54 by which it is received over and retained along the peripheral edge of the valve face 26 completely thereabout. For sealing with the curved sealing surfaces 40 and 42 of the case, the seal 52 is formed with a flexible T-shaped rim 56 along the curved or arcuate side edges 58 of the valve face 26 (see FIGS. 2–5). The seal rim 56 has one extension 60 which extends perpendicularly from a cantilevered portion 62 of the seal and radially inward toward the sealing surface 40 and another extension 64 which also extends perpendicularly from the cantilevered seal portion 62 but radially outward toward the other sealing surface 42. Then for sealing with the respective end sealing surfaces 44, 46 and 45, 47 of the case, the seal is formed at the two axially-extending straight edges 66 of the valve face with a radially outwardly-projecting extension 68 and 70 respectively which are thus both mounted in cantilever manner.

With the valve thus mounted for rotary movement about an axis offset from those of the sealing surfaces 40 and 42, the valve when rotated clockwise into the FIG. 3 position to close the opening 34 causes the edge of the two curved side seal extensions 60 to contact along their length against the respective radially outwardly facing curved sealing surfaces 40 on the duct while the one end seal extension 68 contacts sideways against the case's end sealing surface 44 and the other end seal extension 70 contacts sideways against the case's end seal surface 45. The seal is sized according to the geometrical relationship between the valve face and the sealing surfaces 40, 44 and 45 so that the cantilever portion 62 of the curved side seal portions 60 and the straight end seal portions 68 and 70 flex when moved to this closed valve position to thereby tightly seal the air duct opening 34 with a predetermined contact pressure. Then when the valve is pivoted in the counterclockwise direction as shown in FIG. 4, the two curved side seal portions 60 lift rather than slide off the case's two curved sealing surfaces 40 while the two end sealing portions 68 and 70 simultaneously lift off the case's respective end sealing surfaces 44 and 45 so that the effort to rotate the valve diminishes to substantially zero (i.e. only the bearing friction at the shaft 20) immediately as the valve is rotated to open the hot air duct opening 34 while starting to close the cold air duct opening 36. Then as the valve approaches the other extreme or closed position closing the cold air duct opening 36 as shown in FIG. 5, the two end seal portions 68 and 70 contact sideways against the corresponding sealing surfaces 46 and 47 on the case while the curved seal portions 64 now move into flexed engagement along their length with the opposite sealing surfaces 42 on the case to tightly seal the cold air duct opening 36 in the same manner as the hot air duct opening 34 previously described.

Thus, in the present invention the geometrical relationship of the valve-seal assembly to the case provides controlled seal contact pressure at both of the closed valve positions with zero seal pressure in the midrange of valve travel thereby eliminating those problems normally associated with rotary air valves which have sliding seal contact while providing valve-seal control lever efforts comparable to current flapper or flat type valve systems. Furthermore, by the valve pulling away from the sealing surface as the travel increases, the chances of the valve freezing to the seat or sealing surface at low temperature conditions are greatly reduced. Moreover, it will be appreciated that the seal design enables a single rotary air valve to seal multiple openings resulting in a simple compact assembly.

The above described preferred embodiment is thus illustrative of the invention which may be modified within the scope of the appended claims.

The embodiments of the invention in which an exclusive property or privilege is claimed are defined as follows:

1. In combination, a case having a pair of air ducts with adjacent openings through which air may flow, a rotary air valve mounted in the case for rotatable movement about an axis so as to selectively cover the openings to prevent air flow therethrough, the openings each having a peripheral portion extending thereabout in the respective ducts, the air valve having a peripheral edge that is sealed with respect to the peripheral portion about the respective openings so as to sealingly close same when the air valve covers same, both the peripheral portion about the openings and the peripheral edge on the air valve having corresponding straight sections extending parallel to the axis and corresponding curved sections extending about the axis at certain fixed radii, characterized by the peripheral portions about the openings facing outwardly and inwardly in opposite radial directions relative to the valve axis, flexible elastomeric seal means extending along and mounted on the peripheral edge of the air valve for flexibly engaging the peripheral portion about the respective openings when the air valve covers same so as to sealingly close same, the curved sections of the peripheral portions about the openings having a different fixed radii curvature whose axes are parallel and offset from the axis about which the air valve rotates so that a predetermined contact pressure is established between and along the sealing means on the air valve and the peripheral portion about the respective openings to provide tight sealing when the air valve covers same but as the air valve is rotated to uncover the respective openings the peripheral edge of the air valve lifts away because of the respective offset axes so that the contact pressure immediately diminishes to zero to thereafter permit further rotation of the air valve to uncover the one closed opening and cover the other opening uninhibited by contact of the sealing means with the peripheral portions about the openings.

2. The combination set forth in claim 1, further characterized by the seal means having a flexible T-shaped rim extending along the peripheral edge of the curved sections of the air valve.

* * * * *